United States Patent Office.

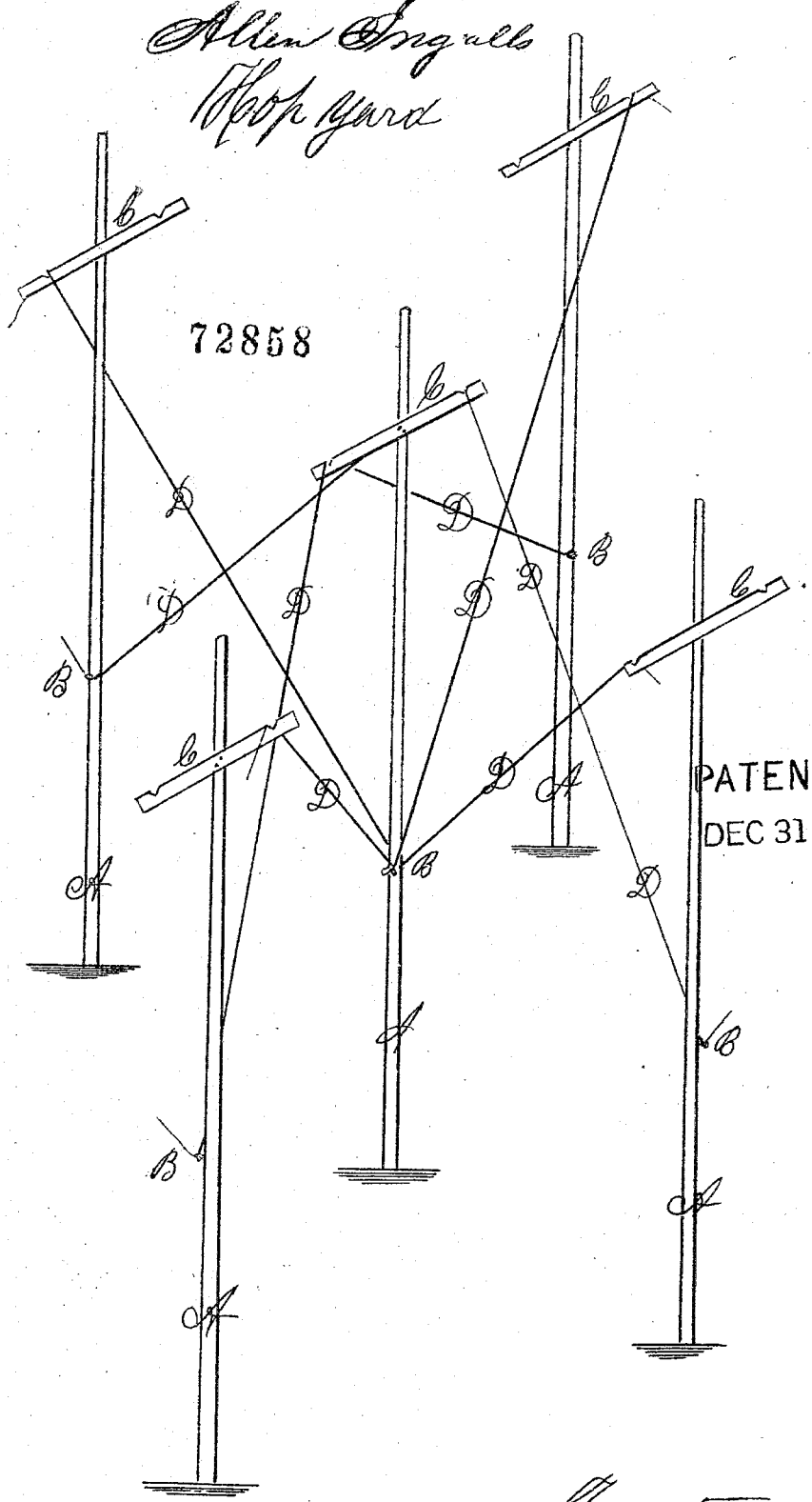

ALLEN INGALLS, OF HARTWICK, NEW YORK.

Letters Patent No. 72,858, dated December 31, 1867.

IMPROVEMENT IN POLING HOPS.

*The Schedule referred to in these Letters Patent and making part of the same.*

TO ALL WHOM IT MAY CONCERN:

Be it known that I, ALLEN INGALLS, of the town of Hartwick, in the county of Otsego, and State of New York, have invented a new and improved Mode of Poling Hops; and I do hereby declare that the following is a full and exact description thereof, reference being had to the accompanying drawings, and to the letters of reference marked thereon.

The nature of my invention consists in using one pole to each hill of hops, said pole having a cross-bar at or near the top, and in having four strings run from each pole, which pass over the cross-bars of the adjoining four poles, having but one vine to each string, thereby distributing them more evenly over the yard, preventing snarls, and giving the sun and air a better chance to circulate amongst them.

A A, &c., are the poles cut the ordinary length, say from ten to fourteen feet. B B, &c., are nails or their equivalents, driven into the poles about five feet from the earth. C C, &c., are cross-bars about three feet long, nailed, or in any other suitable manner fastened to the pole at or near the top. If the poles are long, the cross-bars may be placed a short distance from the top, so that when the bottom becomes decayed and needs re-sharpening, the cross-bars can be removed to the top of said poles. D D, &c., is the twine or cord.

The poles may be sawed or round, and I set one pole in each hill of hops, with the cross-bars in the proper direction. I run four vines up each pole about five feet, where I attach the twine, running one string over one end of the cross-bar on the adjoining pole east, one over the bar on the pole west, one over the bar on the pole north, and one over the bar on the pole south; each cord passing down to the place of connection on the next pole beyond, and then over the cross-bar on the next pole beyond again, and so on both ways throughout the yard; that is, from east to west and from north to south. I make a notch in the cross-bar near each end for the twine to rest in; and to prevent the cords coming in contact where they cross each other, I put the cross-bar on the pole with one end a few inches higher than the opposite end of said cross-bar. The twine can be run from pole to pole through the yard without being cut to pieces.

By this mode of training hops they can be gathered without cutting the vines, by lifting the cord from the cross-bar and hanging it on the pole at a suitable height for picking.

What I claim as my invention, and desire to secure by Letters Patent, is—

The combination and arrangement of the poles A, cross-bars C, and cords D, as and for the purpose set forth.

ALLEN INGALLS.

Witnesses:
   SAMUEL HARPER,
   GEORGE A. SMITH.